April 17, 1962   W. A. ROWLETT   3,030,133
BALL STUD ASSEMBLY
Filed June 10, 1960

WILLARD A. ROWLETT
*INVENTOR.*

BY *Loyal J. Miller*

ATTORNEY

3,030,133
BALL STUD ASSEMBLY
Willard A. Rowlett, 409 Hatley Drive, Bethany, Okla.
Filed June 10, 1960, Ser. No. 35,284
7 Claims. (Cl. 287—88)

The present invention relates to automotive repairs and more particularly to a replacement ball stud assembly for front wheel suspension.

Automotive ball joint suspension assemblies have a common fault, namely, that of an undesirable amount of play between the segmental spherical inner wall bearing surface of the housing and the ball nested therein. A certain degree of looseness of fit between these two mating parts is frequently detectable on new automobiles. Furthermore, since it is difficult to maintain an adequate film of lubricant at points of contact, the ball joint wears rapidly. A snug fitting interconnection between the parts forming the ball joint is imperative in front wheel suspension for control of the car in steering and to eliminate excessive tire wear by caster and camber changes.

It is, therefore, the principal object of the present invention to provide a ball stud and one half housing assembly for replacing worn ball joints.

Another object is to provide a ball joint repair kit which will maintain a desired close fit between the ball and its surrounding bearing surface and yet which will permit freedom of movement of the joint.

An additional object is to provide an assembly of this class which is durably constructed and which will last out the remainder of the life of the vehicle.

Another object is to provide a ball stud assembly which provides an additional bearing surface for ease of operation of the ball joint.

Still another object is to provide an assembly which will compensate for release of the vehicle weight on the joint and maintain the joint in proper position until the vehicle weight is again applied.

The present invention accomplishes these and other objects by providing a housing segment having a segmental spherical inner bearing surface for replacing the worn out conventional upper half section of the housing. A diametrically divided and bored ball member, nested by the housing, receives a steering knuckle connected shaft. Spring and nut means maintains the shaft within the ball member.

Other objects will be apparent from the following description when taken in conjunction with the accompanying single sheet of drawings, wherein.

Like characters of reference designate like parts in those figures of the drawings in which they occur.

In the drawings.

Figure 1:
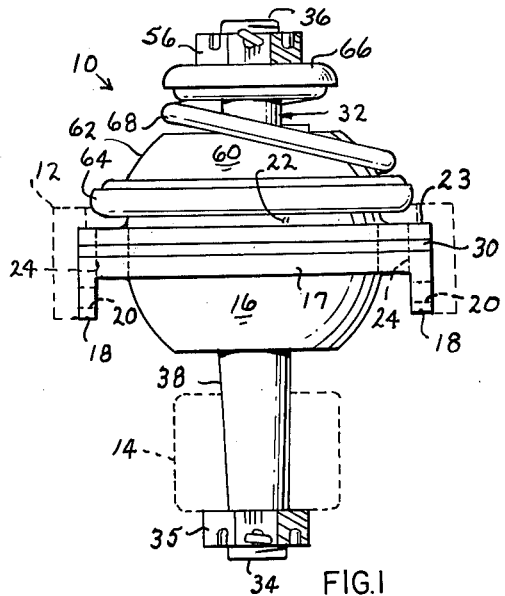
FIGURE 1 is an elevational view of the device in assembled relation illustrating, by dotted lines, its connection with a steering knuckle and the distal end portion of a load supporting arm.
Figure 2:
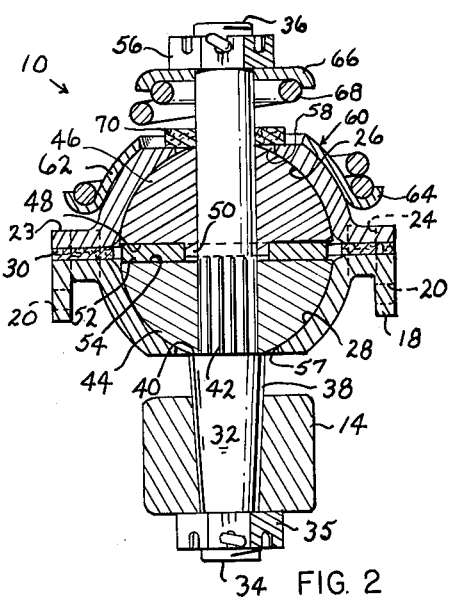
FIGURE 2 is a vertical cross-sectional view of the device shown in FIG. 1.
Figure 3:
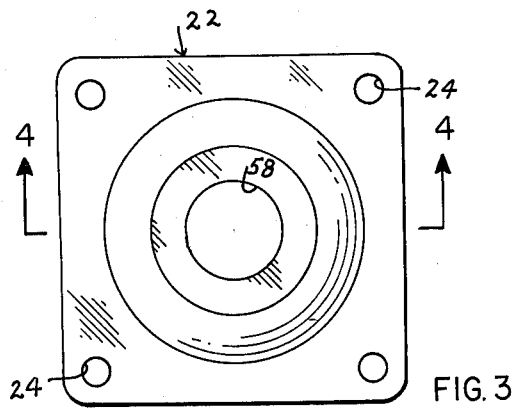
FIGURE 3 is a top plan view of the replacement housing.
Figure 4:
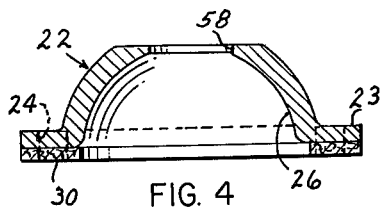
FIGURE 4 is a vertical cross-sectional view taken substantially along the line 4—4 of FIG. 3.
Figure 5:
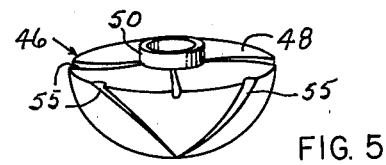
FIGURE 5 is a perspective view of the upper segment of the ball member.
Figure 6:
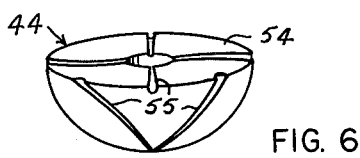
FIGURE 6 is a view similar to FIG. 5, of the lower segment of the ball member in an inverted position.

The reference numeral 10 indicates the device, as a whole, connected with the distal end of a load supporting arm 12 and a steering arm knuckle 14. A conventional segmental spherical lower housing member 16 is connected by depending flanged edges 18 to the load supporting arm by rivets, not shown, extended through suitable apertures 20. The upper segmental spherical housing plate, indicated generally at 22, is segmental spherical in general configuration and is formed for co-operative assembly with the lower housing portion 16 by rivets or bolts, not shown, extended through line drilled apertures 24. The housing member 22 replaces the worn out conventional similarly formed housing, not shown. The housing member 22 includes a segmental spherical inner bearing surface 26 which co-operates with a similar bearing surface 28 of the lower housing 16 to receive a ball member. Suitable gasket means 30 is interposed between the outstanding flanged edges 17 and 23, respectively, of the two housings. The conventional ball member, nested by the housing sections, including a stud end portion connected with the steering knuckle arm 14, is removed. A shaft 32 having oppositely threaded ends 34 and 36 is provided with a tapered end portion 38 which is co-operatively received by the conventional bore formed in the steering knuckle arm 14. A nut 35 holds the shaft within the arm 14. The remaining portion of the shaft is diametrically reduced adjacent the tapered end portion 38, to form an annular shoulder 40, and is provided with a circumferential series of splines or longitudinally extending teeth 42 adjacent the shoulder 40. A spherical ball member, adapted to be closely received by the substantially spherical inner bearing surfaces of the housings 16 and 22, is diametrically bored to be closely received by the shaft 32. The ball member is diametrically divided, perpendicular to its bore, to form a lower segmental spherical ball section 44 and an upper segmental spherical ball section 46. The lower ball section 44 is pressed on the splines 42 and in contact with the shaft shoulder 40 to insure rotative movement of the section 44 with the shaft. The diametrical flat face of the upper section 46 is cut away, as at 48, and which is defined by an annular ring portion 50 surrounding the bore of the upper member. A ring member 52 is interposed between the flat diametrical face 54 of the lower member 44 and the recessed surface 48 of the upper member to provide a bearing surface between the two halves of the ball member. The ball members and the ring 52 are preferably case-hardened. The flat faces 48 and 54 and segmental spherical surfaces of the ball sections are each preferably provided with oil grooves as at 55. As shown in the drawings, the end 36 of the shaft projects outwardly beyond the limit of the housing 22 and is provided with a threadedly engaged nut 56. As shown in FIG. 2, the lower housing 16 is provided with a central aperture 57 aligned with a central aperture 58 formed in the upper housing 22. The apertures 57 and 58 surround the polar region of the ball members 44 and 46 and are substantially greater diametrically than the shaft 32 to permit a certain amount of lateral movement of the latter without contact of the shaft with either housing.

A spring retaining member 60 having a segmental spherical, or inverted cup-shaped wall 62, is formed with the inner surface thereof for co-operative contiguous contact with the outer segmental spherical surface of the upper housing half 22 when placed upon the latter. The member 60 is provided with a central aperture slightly greater diametrically than the aperture 58 of the upper housing surrounding the shaft 32. The member 60 projects from the polar region of the housing 22, through which the shaft projects, toward the flange portion 23 of the housing, but, terminates in an annular flange 64 short of contact with the flange portion 23. A washer-like spring retaining member 66 surrounds the shaft 32 adjacent the nut 56. A helical tapered spring 68 is interposed between the washer-like member 66 and the annular flange 64. The spring 68 is designed to permit some downward movement of the shaft 32 when the weight, carried by the supporting arm 12, is removed from the steering knuckle shank 14 and to return the shaft upwardly to its preferred position with the shoulder 40 contacting the adjacent lower surface of the ball segment 44. A felt washer 70, or the like, preferably surrounds the shaft 32 adjacent the housing aperture 58 to exclude dust and dirt. The weight of the vehicle is normally carried by contact between the ball segment 44 and the inner spherical surface 26 of the housing 22.

Obviously the invention is susceptible to some change or alteration without defeating its practicability, and I therefore do not wish to be confined to the preferred embodiment shown in the drawings and described herein, further than I am limited by the scope of the appended claims.

I claim:

1. A repair kit for a suspension ball and socket joint connecting a steering knuckle to the distal end of a load supporting arm, said joint having a housing carried by said arm, said housing having a segmental spherical inner wall bearing surface adapted to receive a ball stud member in bearing engagement with said inner bearing wall with a shank portion extending from the ball end through an opening in said housing for connection with said steering knuckle, comprising: a diametrically bored ball member adapted to be closely received by said spherical inner bearing wall, said ball member being diametrically divided perpendicular to its bore; bearing means interposed between the ball member halves; a shaft connected by one end portion to said steering knuckle and extending, at its other end, through the bore in said ball member; and means connected with the end portion of said shaft opposite its steering knuckle connected end portion maintaining said shaft within said ball member.

2. A repair kit for a suspension ball and socket joint connecting a steering knuckle to the distal end of a load supporting arm, said joint having a segmental housing composed of an upper and a lower half both connected with said load supporting arm, said housing having a segmental spherical inner wall bearing surface adapted to receive a ball stud member in bearing engagement with the inner bearing wall with a connected shank end portion projecting outward through the lower housing half for connection with a steering knuckle, comprising: a diametrically bored ball member adapted to be closely received by said segmental spherical inner bearing wall, said ball member being diametrically divided perpendicular to its bore; bearing means interpoesd between the ball member halves; a shaft having one tapered end portion connected to said steering knuckle and having an opposite diametrically reduced end portion extending through the bore in said ball member; and spring and nut means connected with the end portion of said shaft opposite its steering knuckle connected end portion maintaining said shaft within said ball member.

3. A repair kit for a suspension ball and socket joint connecting a steering knuckle to the distal end of a load supporting arm, said joint having a segmental spherical housing composed of an upper and a lower half both connected with said load supporting arm, said housing having a segmental spherical inner wall bearing surface adapted to receive a ball stud member in bearing engagement with the inner bearing wall with a connected shank end portion projecting outward through the lower housing half for connection with a steering knuckle, comprising: a diametrically bored ball member adapted to be closely received by said segmental spherical inner bearing wall, said ball member being diametrically divided perpendicular to its bore for forming an upper and a lower substantially hemispherical member cooperatively nested by the inner bearing surfaces of the respective upper and lower halves of said housing, said upper half of the ball member having an annular ring adjacent its bore projecting toward the lower ball member; a bearing interposed between the ball member halves around said annular ring; a shaft having a tapered end portion connected to said steering knuckle and having an opposite diametrically reduced end portion extending through the bore in said ball member; and spring and nut means connected with the end portion of said shaft opposite its steering knuckle connected end portion for maintaining said shaft within said ball member.

4. A ball stud assembly for repairing a suspension ball socket joint connecting a steering knuckle to the distal end of a load supporting arm, said joint having a horizontally divided segmental spherical housing composed of upper and lower halves, both connected with said load supporting arm, said housing having a segmental spherical inner wall bearing surface adapted to receive a ball stud bearing member in bearing engagement, comprising: an improved segmental spherical housing member adapted to replace said upper spherical housing member and be connected with said load supporting arm, said improved housing member having a central aperture; a diametrically bored ball member adapted to be closely received by the segmental spherical wall bearing surface of said lower housing member and said improved housing member, said ball member being diametrically divided perpendicular to its bore forming upper and lower substantially hemispherical ball member halves; a shaft having a tapered end portion connected to said steering knuckle and having a diametrically reduced end portion opposite its connection with said steering knuckle inserted through said ball member halves, said shaft having a series of splines around its periphery adjacent said tapered end portion for frictional engagement with the wall forming the bore of said lower ball member; and spring and nut means connected with the end portion of said shaft opposite its steering knuckle connected end portion for maintaining said shaft within said ball member.

5. Structure as specified in claim 4 and a series of oil grooves formed on the adjacent faces of said ball member halves.

6. Structure as specified in claim 4 and a ring member interposed between said ball member halves around the shaft.

7. Structure as specified in claim 4 in which the spring and nut means includes a nut threadedly engaged with the end portion of said shaft opposite its steering knuckle connected end portion, a segmental spherical spring retaining member having inner wall bearing surfaces adapted for contiguous contact with the outer segmental spherical wall bearing surface of said improved upper housing member, a spring retaining member surrounding said shank adjacent said nut, and a helical spring interposed between said spring retaining members.

References Cited in the file of this patent

UNITED STATES PATENTS

| 2,544,582 | Booth | Mar. 6, 1951 |
| 2,933,336 | Pritchard et al. | Apr. 19, 1960 |

FOREIGN PATENTS

| 505,978 | Germany | Aug. 27, 1930 |